Aug. 5, 1941.  J. A. MUNKEBO  2,251,413
BORING BAR
Filed March 6, 1939

JAMES A. MUNKEBO.
INVENTOR.

BY Stanley Lightfoot
ATTORNEY.

Patented Aug. 5, 1941

2,251,413

UNITED STATES PATENT OFFICE 2,251,413

BORING BAR

James A. Munkebo, Detroit, Mich.

Application March 6, 1939, Serial No. 260,074

1 Claim. (Cl. 279—6)

This invention relates to boring bars, and has for its object to provide for fine adjustment of the bit setting to quickly determine the size of hole to be bored, and permit of a relatively considerable variation of such size, without necessitating the bar being held in an additional offset boring head as has hitherto been the usual practice. The size of such heads imposes many limitations on the boring operations, and they are also more or less expensive; and it is the object of the present invention to render unnecessary the use of such a separate boring head, and to incorporate in a very simple and effective manner the means of adjustment within the boring bar itself.

An object of the invention is to provide a boring bar in which the end portion thereof is adjustable laterally of the remaining shank portion, with means within the shank portion of the bar for effecting such adjustment, and it is a further object to provide a chamber within the said shank portion of the bar and an extension on the end portion movable laterally within said chamber, together with an adjusting screw having threaded engagement with said extension and journaled at its ends in the side walls of said chamber.

A still further object is to provide for the detachment of said extension from said end portion, after removal of said adjusting screw, to permit the detachment of said end portion laterally from transverse engaging ways in end of the said shank portion.

Still further objects and advantages subsidiary to the aforesaid objects, or resulting from the construction and operation of the invention as it may be carried into effect, will become apparent as the said invention is hereinafter further disclosed.

In carrying the said invention into effect, I may provide the novel construction and arrangement of parts hereinafter described, by way of example, having reference to the accompanying drawing, wherein.

Similar characters of reference indicate similar parts in the several figures of the drawing.

Figure 1:
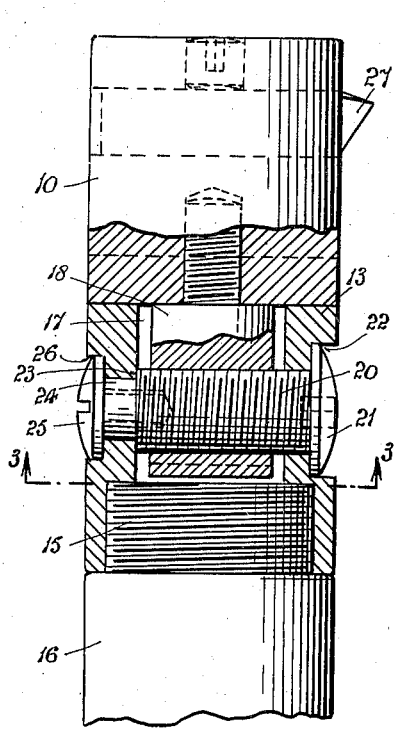
Figure 1 is an elevation, partly in section, of the improved boring bar.
Figure 2:
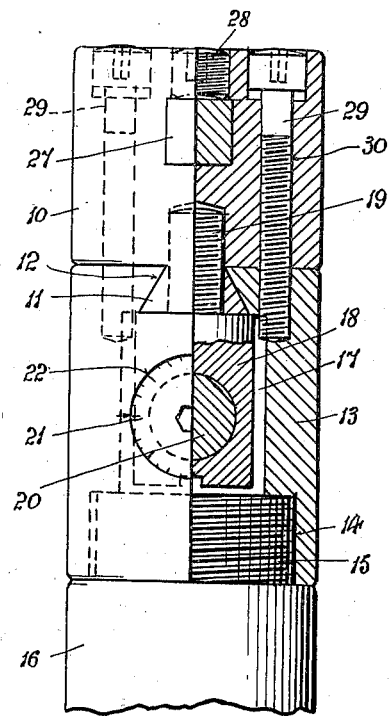
Figure 2 is an elevation taken at right angles to that of Figure 1, also shown partly in section.
Figure 3:
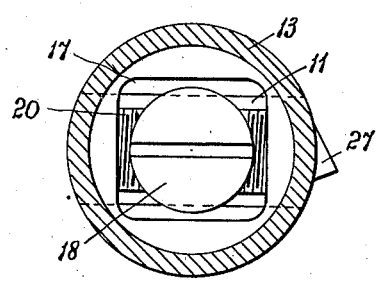
Figure 3 is a transverse section taken on a plane indicated by the line 3—3, in Figure 1.
Figure 4:
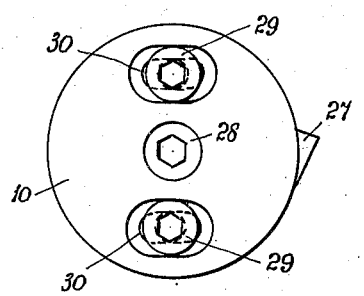
Figure 4 is an end elevation of the device.

10 is the end portion of the boring bar provided on its inner end with a dovetail tenon 11 whereby it is laterally movable in a corresponding dovetail slot 12 formed in the outer end of a tubular shank member 13.

This shank member is shown as being internally threaded at 14 on its inner end to receive the threaded portion 15 of a further shank member or extension 16 for convenience so that shanks of any desired length may be substituted according to desire.

The bore of the member 13 forms a chamber 17 within which is located a nut or extension 18 of smaller cross sectional dimensions than said bore, said extension being provided with a pin 19, preferably threaded, and engaging with the end portion 10 of the boring bar. This extension is transversely threaded to receive the correspondingly threaded adjusting screw 20, the head 21 of which enters a faced recess 22 in the wall of the shank member 13. The opposite end 23 of the threaded portion of the adjusting screw shoulders against the correspondingly faced wall of the chamber 17, and a reduced portion 24 of the said adjusting screw is journaled in the wall opposite to the head 21 and provided with a cap screw 25, which enters a recess 26 in the said wall and holds the said adjusting screw against undesired movement transversely of the boring bar.

The extension 18, being smaller in diameter than the chamber within which it is located, may travel transversely of the boring bar in one or other direction under the influence of rotation of the adjusting screw by means of any suitable implement, and such movement will be transmitted to the end portion 10 of the boring bar by virtue of the connection of the extension therewith, the adjusting screw being, of course, positioned in the same direction transversely of the bar as is the dovetail slot 12.

27 is the boring bit which may be of any convenient type and extend in any required direction, 28 being the set screw by which the bit is locked in the bar.

In order to provide increased support for the movable end portion of the boring bar in use, and to assist in the locking thereof in positions of adjustment, I show a pair of locking screws 29 passing thru elongated slots 30 in the end portion of the boring bar and entering the wall of the shank portion 13 of the bar, these screws being loosened to permit of adjustment of the said end portion on the shank portion of the bar and thereafter tightened when adjustment has been effected.

This invention may be developed within the scope of the following claim without departing from the essential features of the said invention and it is desired that the specification and drawing be read as being merely illustrative and not in a limiting sense, except as necessitated by the prior art.

What I claim is:

A boring bar, comprising a rod having a work penetrating end, abutting inner and outer adjustably connected sections of substantially uniform sizes forming the extremity of said penetrating end, a bit fastened directly in the outer section for lateral displacement beyond one side thereof, the inner section being tubular, an extension separably secured to the outer section and laterally movable in the bore of said inner section, dovetailed connections between the sections at the point of fastening of the extension with said outer section, a diametrically disposed adjusting screw journaled in opposite sides of the tubular inner section and engaging the extension for the lateral adjustment of the outer section relative to the inner section and changing the position of the bit independently of its adjustment, locking screws engaging the inner and outer sections in the direction of the length of the rod and accessible at the outermost end face of the outer section for securing both sections together in conformity to the adjustment of said outer section, and a shank on which said inner tubular section is threaded and shouldered, all of the foregoing elements being confined substantially within a circular area defined by the end of said shank.

JAMES A. MUNKEBO.